Feb. 11, 1930.                W. N. GILBERT                1,746,251
                                   SCALE
                             Filed Nov. 29, 1927
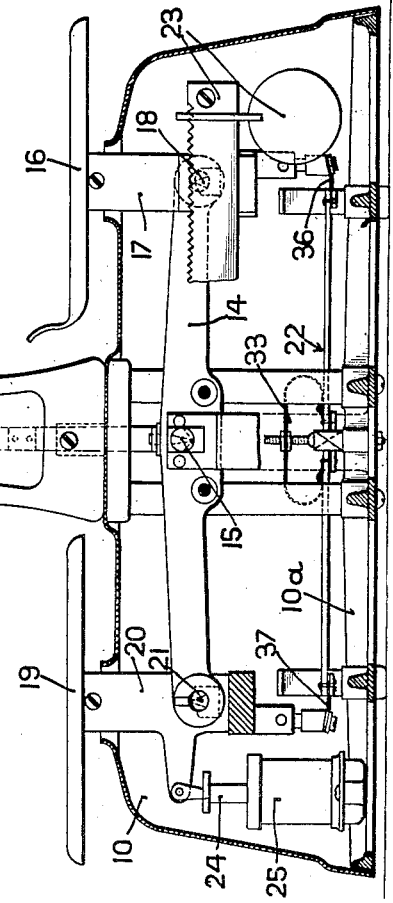
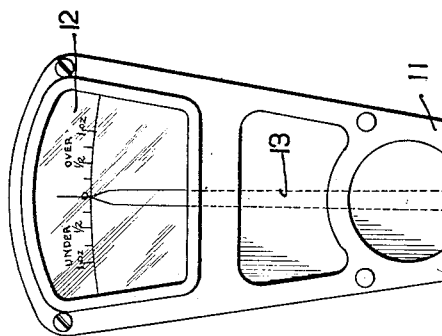
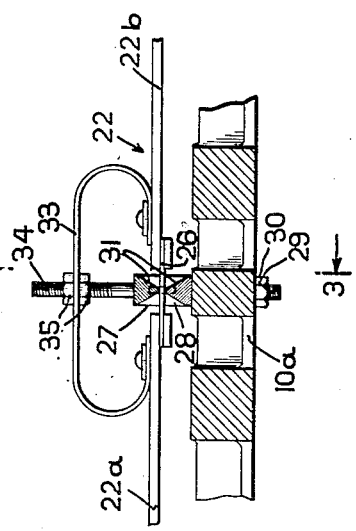
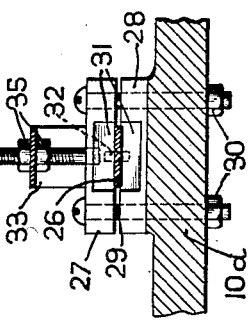
INVENTOR
William N. Gilbert
BY
W. M. Wilson
ATTORNEY Patented Feb. 11, 1930

1,746,251

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

SCALE

Application filed November 29, 1927. Serial No. 236,425.

The invention relates broadly to scales and more particularly to scales of the even balance type provided with an indicator to assist in determining the balance position of the scale beam.

The principal object of the invention is to provide new and improved load counterbalancing mechanisms for scales.

Another object of the invention is to combine a load counterbalancing mechanism with other mechanisms of the scale to the end that certain mechanisms may have two or more functions whereby the number of parts is reduced and the operation simplified and to provide new and improved structure for this purpose.

Another object of the invention is to provide a scale in which the load counterbalancing mechanism is combined with the check mechanism in a new and improved manner to increase the accuracy, simplify the construction and reduce the number of operating parts of the scale.

A further object of the invention is to apply the above advantages to a scale of the even balance type in which the load counterbalancing mechanism in question serves as an auxiliary to counterbalance small amounts of over and under weight.

A further object of the invention is to provide an even balance scale with improved means for accurately indicating small amounts of over and under weight regardless of out of level conditions of the scale base.

These and other incidental objects which will be pointed out hereinafter will be clear from the following description and appended claims.

In the accompanying drawing I have shown for the purpose of illustration one form of mechanism embodying the invention in which:

Fig. 1 is a front elevational view of my scale, certain parts being shown in section.

Fig. 2 is an enlarged sectional detail of the means for sealing the indicator in its normal position.

Fig. 3 is a section taken on line 3—3 of Fig. 2.

The invention may be best understood from a specific example which has been chosen with a view of illustrating several advantages of the invention in a single structure to simplify the explanation. It will be appreciated that various changes, omissions and additions may be made in the structure without departing from the spirit of the invention and that the particular structure shown should be considered merely in the light of a practical example.

The preferred form of the invention contemplates a scale beam joined to a check rod to form a parallelogram in the usual manner. At least two of the elements of the parallelogram are joined together by a resilient member which resists any tendency of the structure to depart from its normal parallelogram form and tends to return it to this form when it is distorted. The resilient member may be in the form of a flat spring tape anchored to the end of the check rod and fastened to a member pivoted to the scale beam. The resilient member may also take the form of a flat spring tape fastened to one end of the check rod and to the scale base, thus replacing the usual pivotal support for the check rod and at the same time serving as a counterbalancing mechanism.

In scales of the even balance type, the check link may be pivoted at its center and have its ends pivoted to members extending from the ends of the scale beam in the usual manner and the resilient member may take the form of an arched flat spring which is supported at its mid section and has its arms connected to the check link on opposite sides of the central pivot of the latter. The latter form may also be used as a calibrating or sealing device for the over and under weight indicator by making the support for the spring adjustable so that its arms may be variously tensioned to apply different resisting forces to the movement of the check link from its normal position. Any of these devices may be used alone or a combination of any number of them, and for the purpose of explanation, an even balance scale is illustrated which embodies a combination of all three.

Referring to Fig. 1, the scale includes a base or support 10, a casing 11, an index or chart 12 and an indicator 13 mounted directly on the scale beam 14 which is fulcrumed on knife edges 15. One end of the beam carries a weighing plate or pan 16 having a downwardly extending stem 17 mounted on the beam by knife edges 18. The other end of the beam carries a similar pan 19 for the well known counter weights to bring the beam 14 in balance when a commodity to be weighed has been placed on pan 16. Pan 19 is provided with a stem 20 supported on the beam by knife edges 21. At their lower ends, stems 17 and 20 are connected to a check 22 to be presently described in detail. The scale is provided with the usual tare means 23 comprising a beam and adjustable poise. A piston 24 of a dash pot 25 is fixed at one end to a projection on the downwardly extending stem 20 to dampen the oscillations of beam 14.

Referring to Figs. 2 and 3 check member 22 is shown in detail as consisting of two separate, opposing arms 22$^a$ and 22$^b$ joined by a straight flat spring 26 which extends between a pair of similar blocks 27 and 28. The blocks are joined to each other and to the base plate 10$^a$ by bolts 29 extending loosely through holes in the blocks and the base plate. The blocks are held to the base plate by nuts 30. The blocks are provided with bevelled portions 31 between which the spring 26 is clamped thus providing what may be called a flexible pivot for the check 22. A pin 32 is fixed in the lower block and extends freely through an opening in spring 26 and the upper block thereby serving to locate the parts in proper position. An arched spring 33 has its ends fast to the arms 22$^a$ and 22$^b$. The arch of the spring 33 extends above spring 26 and is provided with an aperture through which extends a threaded stud 34 fixed to the upper block 27. Lock nuts 35 on opposite sides of the spring 33 are adjustable on the threaded stud to permit variation in the tension of the spring. Regardless of the tension in the spring, the latter exerts equal and opposite forces on the arms 22$^a$ and 22$^b$. These forces tend to keep the check member and the attached scale beam 14 parallel to the base of the scale in spite of tilting of the base thus holding the pointer 13 in its zero or normal position with respect to the chart 12 since the latter is fixed relatively to the base. This structure provides what may be called a pivotal support for the check with adjustable resistance means to oppose its displacement from its normal position parallel to the base.

The stems 17 and 20 of the plates 16 and 19 attached to the ends of the opposite arms of the check member 22 by leaf springs 36 and 37 which are rigidly attached to the stems but fastened to the check arm through swivel connections to prevent binding when the stems and the check member are slightly out of alignment.

The springs 26 and 33 tend to hold the arms 22$^a$ and 22$^b$ parallel with the scale base and the resiliency of these springs as well as the resiliency of the springs 36 and 37 therefore oppose any motion of the scale beam from its balanced position, forming in effect an auxiliary load offsetting mechanism to counter balance small amounts of over and under weights. Incidentally this auxiliary load offsetting mechanism permits accurate indications of small amounts of over and under weight.

The scale chart 12 is graduated as indicated in fractions of ounces and the adjustability of the springs 33 permits accurate adjustment of the indicator 13 for these graduations. For example, a half ounce sealing weight may be placed on either scale pan and the spring 33 tightened or loosened until the indicator 13 registers exactly with the one-half ounce graduations on the chart 12. Thereafter, owing to the resistance in the spring system the scale will weigh small amounts of over and under weights accurately throughout the range of the chart.

Although the scale has been illustrated and described as one of the even balance type in which only slight amounts of over and under weights are counterbalanced by the auxiliary spring load counterbalancing devices it is obvious that other modifications can be devised. For example, the spring load counterbalancing devices may be arranged to counterbalance the entire load within the normal capacity of the scale. In this case the even balance feature would be in the nature of an auxiliary and would serve the purpose of increasing the weighing capacity of the scale. That is, if the scale were arranged for a normal capacity of ten pounds, for example, the capacity could be doubled by placing a ten pound counter weight on the counter weight pan in which case the indication on the chart would represent the actual weight of the object being weighed less ten pounds.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

What is claimed is:

1. A weighing scale comprising a balance beam, graduated indicator mechanism associated therewith and means for adjusting the beam movements to the graduations comprising means for exerting equal and opposite forces upon the beam and a common element for simultaneously adjusting the amounts of said forces on the beam.

2. A weighing scale comprising a pivoted beam, graduated indicator mechanism associated therewith and means for adjusting the beam movements to the graduations comprising means for exerting opposing forces on opposite sides of the beam pivot proportional to the length of the arms of the beam and a common element for simultaneously and proportionately adjusting the amounts of said forces on the beam.

3. A weighing scale comprising a pivoted beam, graduated indicator mechanism associated therewith and means for coordinating the beam movements to the graduations comprising a flat spring supported intermediate its ends and having its ends connected to the beam on opposite sides of its pivot respectively.

4. A weighing scale comprising a pivoted beam, graduated indicator mechanism associated therewith and means for coordinating the beam movements to the graduations comprising a flat spring adjustably supported intermediate its ends to permit different degrees of tensioning therein and having its ends connected to the beam on opposite sides of its pivot respectively.

5. A weighing scale comprising a pivoted beam, graduated indicator mechanism associated therewith and means for coordinating the beam movements to the graduations comprising a flat spring supported intermediate its ends and having its ends connected to the beam on opposite sides of its pivot point through members equal in length to the arms of the beam.

6. A weighing scale comprising a pivoted beam, graduated indicator mechanism associated therewith and means for coordinating the beam movements to the graduations comprising a pivoted member having arms proportional in length to the arms of the beam and connected thereto and a flat spring supported intermediate its ends and having its ends connected to opposite arms of the pivoted member.

7. A weighing scale comprising a pivoted beam, graduated indicator mechanism associated therewith and means for adjusting the beam movements to the graduations comprising a pivoted member having arms proportional in length to the arms of the beam and connected thereto and a flat spring adjustably supported at its middle and having its ends connected to opposite arms of the pivoted member.

8. A weighing scale comprising a pivoted beam, a pivoted member having arms proportional in length to the arms of the beam and connected thereto and a spring device for exerting equal and opposite forces on said pivoted member and means for adjusting the tension of said spring device to simultaneously vary the values of the equal and opposite forces.

9. A weighing scale comprising a pivoted beam, a pivoted member with resistance means yieldably holding the same in normal position, and resilient members connecting the arms of said pivoted member to the arms of said beam.

10. A weighing scale comprising a pivoted beam, a pivoted member with a leaf spring bearing on each side of its pivot at equal distances therefrom and resilient means connecting the ends of said member to the arms of said beam.

11. A weighing scale comprising a pivoted beam, a pivoted member with a leaf spring having its ends fastened thereto on opposite sides and at equal distances from its pivot point, an adjustable support for said spring to permit varying of its tension and resilient means connecting the ends of said member to the arms of the beam.

12. A weighing scale comprising a pivoted beam, a check member, yieldable means for holding said member in normal position and resilient means connecting the arms of said beam to the check member.

13. A weighing scale comprising a pivoted beam, a pivoted check member, yieldable means engaging said member for holding it parallel to the beam in its balance position and resilient means connecting the ends of said check member to the arms of said beam.

14. A weighing scale comprising a pivoted beam and check mechanism consisting of a pair of oppositely extending arms mounted at one end on a leaf spring in spaced relationship to each other and connected at their other ends to opposite arms of the beam and a support for the leaf spring intermediate the check arms.

15. A weighing scale comprising a pivoted beam with indicator operating mechanism thereon, check mechanism consisting of oppositely extending arms fastened at one end to a common leaf spring and at their other ends to the opposite arms of the beam and a fixed support for the leaf spring to which both check arms are attached.

In testimony whereof I hereto affix my signature.

WILLIAM N. GILBERT.